(12) United States Patent
Gea Aguilera et al.

(10) Patent No.: US 12,509,215 B2
(45) Date of Patent: Dec. 30, 2025

(54) ACOUSTIC ATTENUATION DEVICE FOR AN AIRCRAFT PROPULSION UNIT

(71) Applicant: SAFRAN AIRCRAFT ENGINES, Paris (FR)

(72) Inventors: Fernando Gea Aguilera, Moissy-Cramayel (FR); Adrien Clément Marcel Dubois, Moissy-Cramayel (FR); Jean-Michel Daniel Paul Boiteux, Moissy-Cramayel (FR); Ludovic Mathieu René Wiart, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 146 days.

(21) Appl. No.: 18/260,967

(22) PCT Filed: Jan. 7, 2022

(86) PCT No.: PCT/FR2022/050047
§ 371 (c)(1),
(2) Date: Jul. 11, 2023

(87) PCT Pub. No.: WO2022/148940
PCT Pub. Date: Jul. 14, 2022

(65) Prior Publication Data
US 2024/0059396 A1 Feb. 22, 2024

(30) Foreign Application Priority Data

Jan. 11, 2021 (FR) ..................................... 2100212

(51) Int. Cl.
*B64C 11/00* (2006.01)
(52) U.S. Cl.
CPC .......... *B64C 11/00* (2013.01); *B64C 2230/14* (2013.01)

(58) Field of Classification Search
CPC .. B64C 3/10; B64C 3/16; B64C 21/10; B64C 2230/14
See application file for complete search history.

(56) References Cited

U.S. PATENT DOCUMENTS

| 2,048,399 A | 7/1936 | Grover |
| 2,358,985 A | 9/1944 | Mcandrew |
| 2006/0060721 A1* | 3/2006 | Watts ........................ B64C 3/28 244/200 |

FOREIGN PATENT DOCUMENTS

| CN | 101716995 A | 6/2010 | |
| FR | 3044292 A1 * | 6/2017 | ............. B64C 21/06 |

(Continued)

OTHER PUBLICATIONS

Search Report and Written Opinion issued in International Application No. PCT/FR2022/050047, mailed on May 10, 2022.

(Continued)

*Primary Examiner* — Nicholas McFall
*Assistant Examiner* — Eric Acosta
(74) *Attorney, Agent, or Firm* — Bookoff McAndrews, PLLC

(57) ABSTRACT

Propulsion assembly for an aircraft comprising a turbomachine having at least one rotating part rotating about an axis of rotation, an attachment strut, and a structural element carrying the turbomachine via the attachment strut, the rotating part being disposed upstream of the structural element and of the attachment strut such that an air jet emerging from the rotating part, in the wake of thereof, impacts the structural element and the attachment strut, a leading edge of the structural element and/or of said attachment strut locally comprising at least one acoustic attenuation device disposed at least partly in the wake of the rotating part, the acoustic attenuation device being a local (Continued)

modification of the structure and/or of the profile of the leading edge.

16 Claims, 9 Drawing Sheets

(56) References Cited

FOREIGN PATENT DOCUMENTS

| | | |
|---|---|---|
| WO | 2019158876 A1 | 8/2019 |
| WO | 2020079335 A1 | 4/2020 |

OTHER PUBLICATIONS

Search Report issued in French Application No. 21 00212, mailed on Sep. 15, 2021.

* cited by examiner

[Fig. 1A-1B]
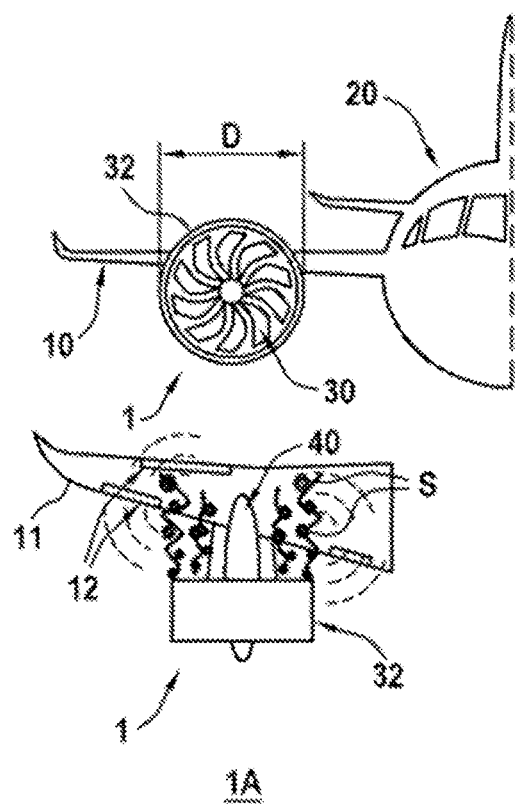
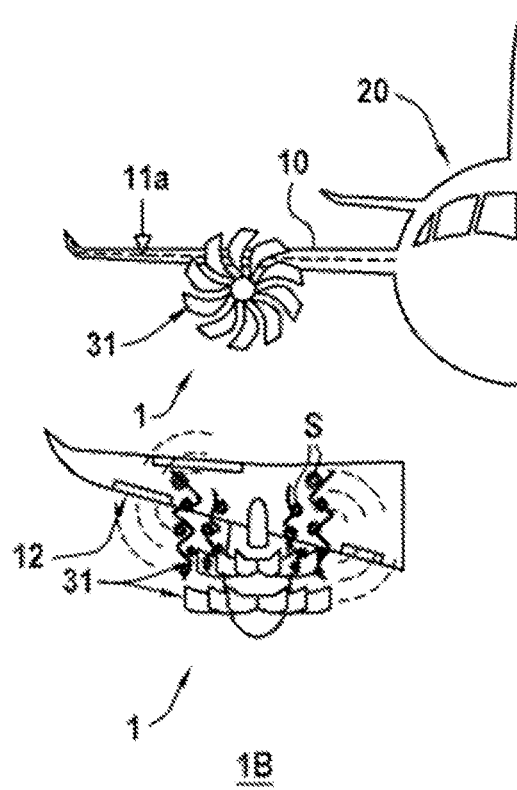
1A
-- Prior Art --
1B
-- Prior Art --

[Fig. 2]
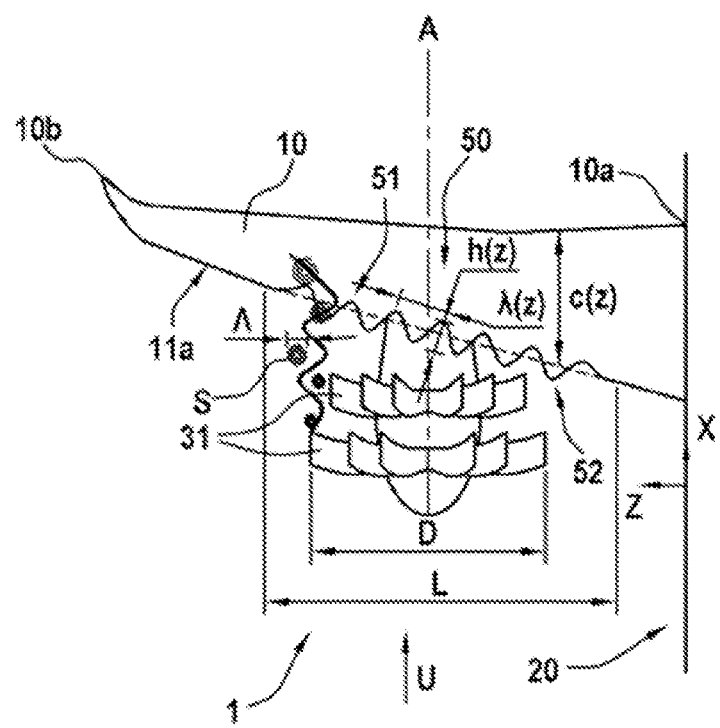

[Fig. 3]
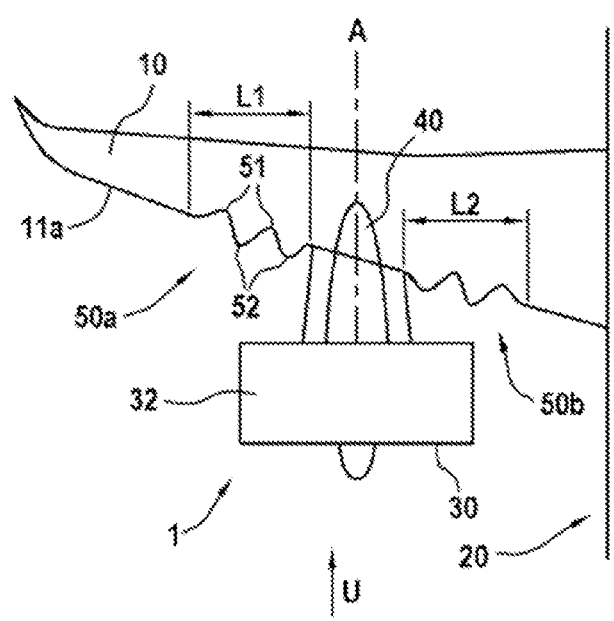

[Fig. 4]
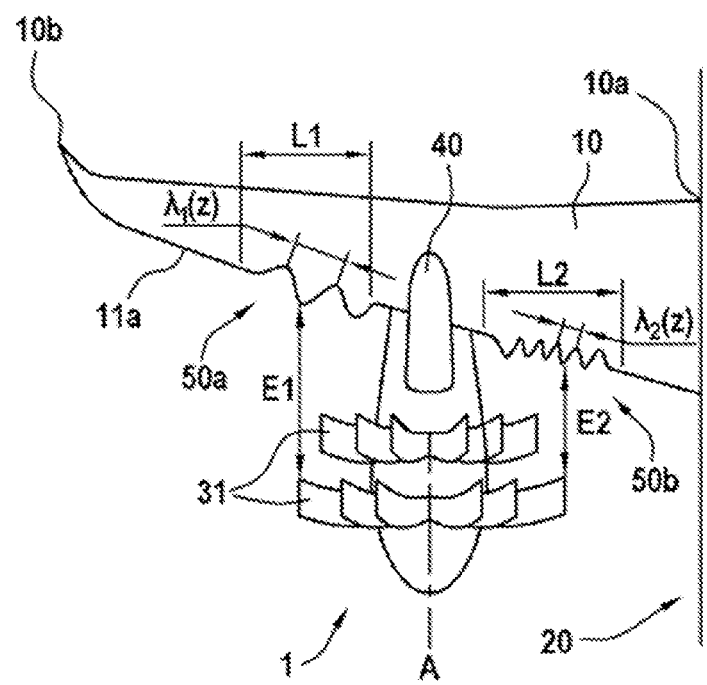

[Fig. 5]
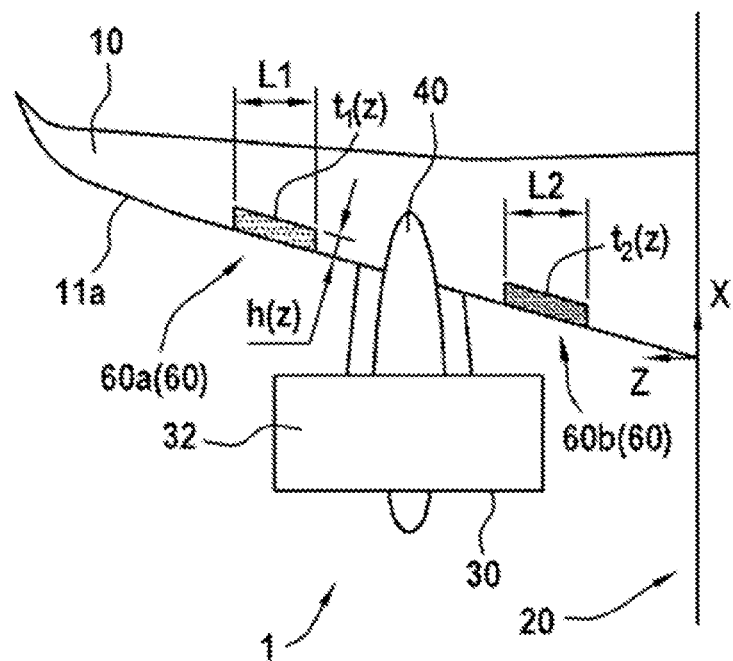

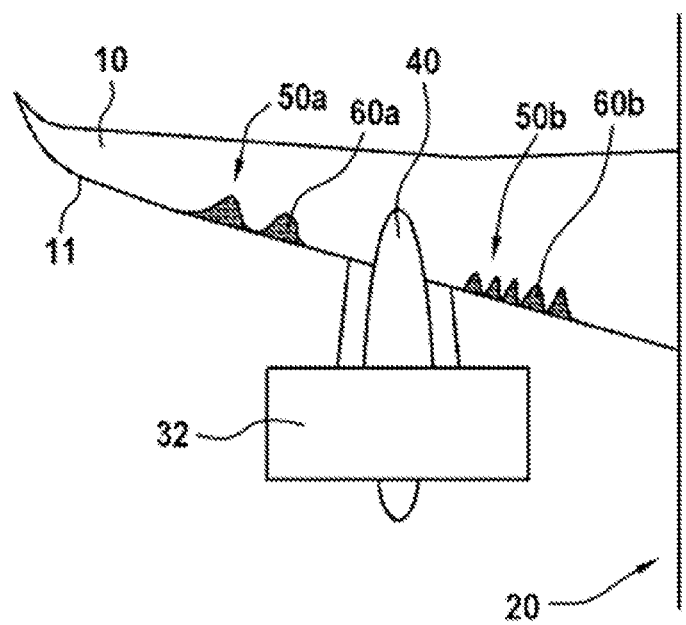
[Fig. 6]

[Fig. 7]
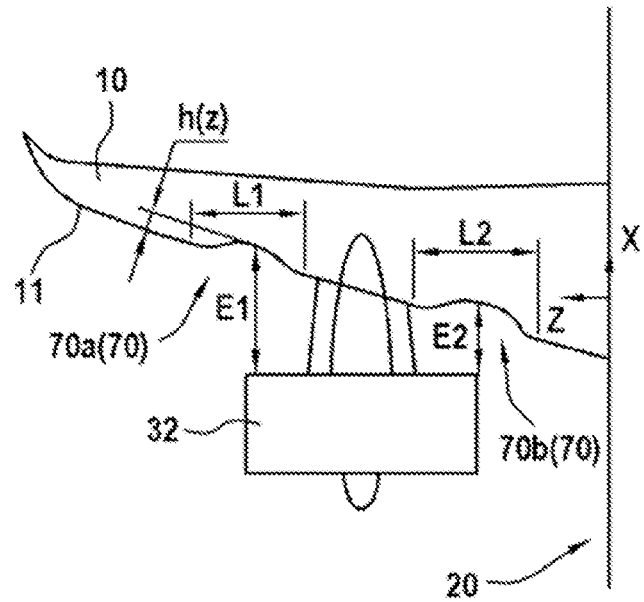
[Fig. 8]
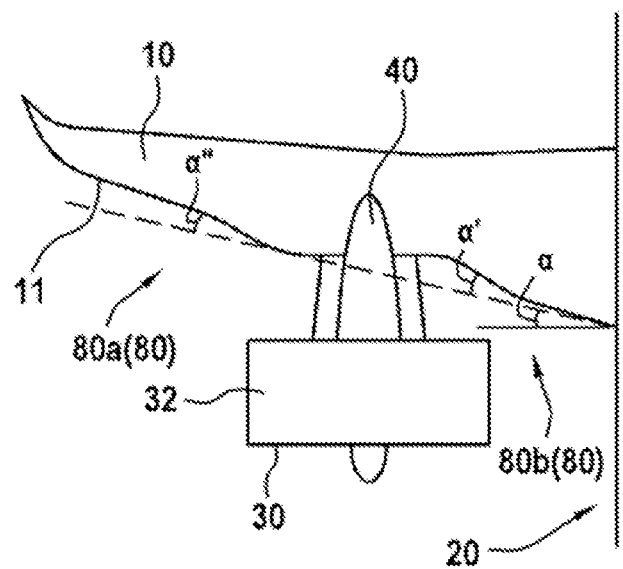

[Fig. 9]
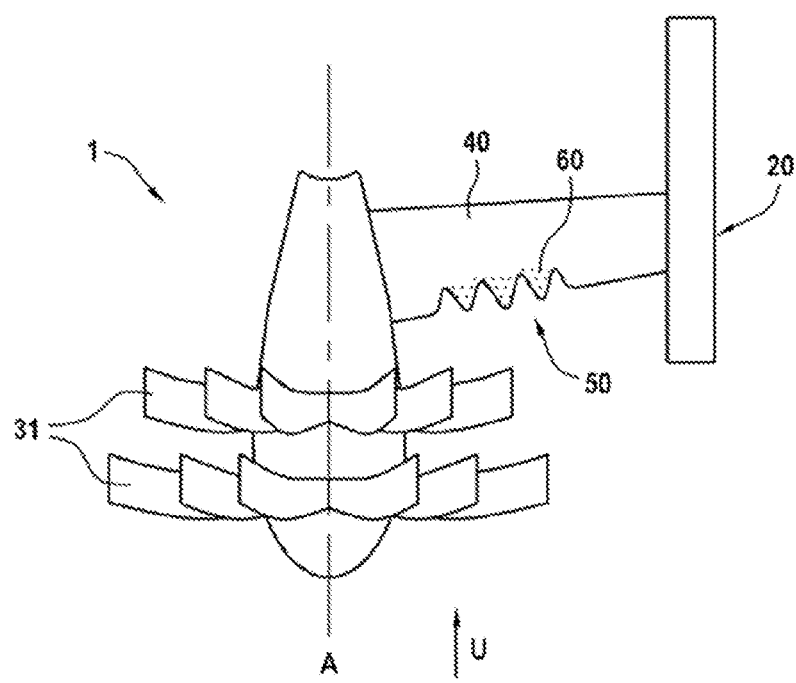

[Fig. 10A-10C]
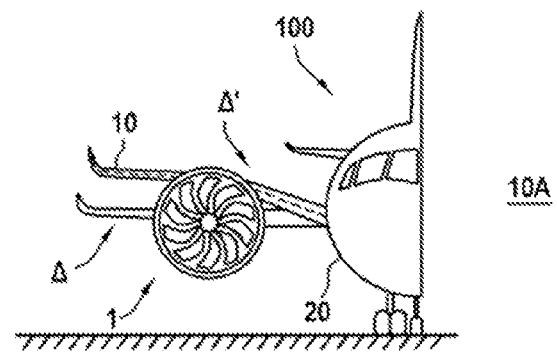
10A
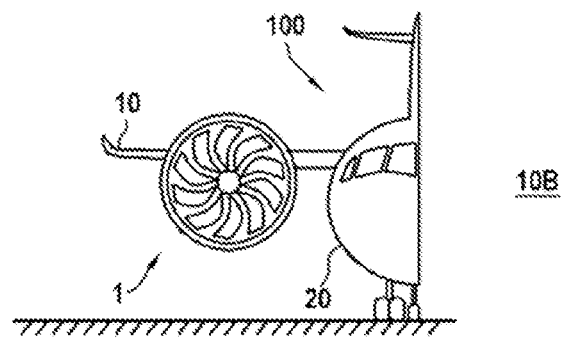
10B
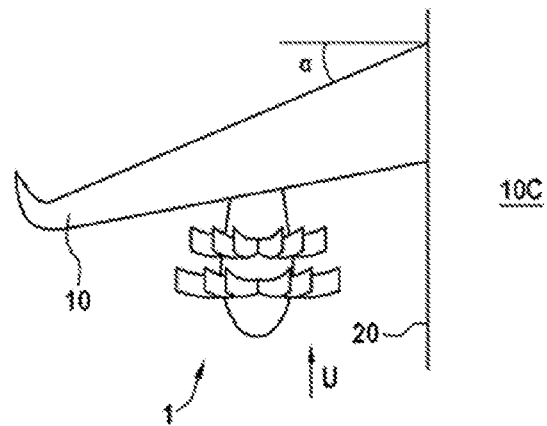
10C

ACOUSTIC ATTENUATION DEVICE FOR AN AIRCRAFT PROPULSION UNIT

CROSS-REFERENCE TO RELATED APPLICATIONS

This is a National Stage Application under 35 U.S.C. § 371 of International Application No. PCT/FR2022/050047, filed Jan. 7, 2022, now published as WO 2022/148940 A1, which claims priority to French Patent Application No. 2100212, filed on Jan. 11, 2021.

TECHNICAL FIELD

The present invention relates to the general field of turbomachines, and more particularly applies to aircraft turbojet engines and turboprops of the large-diameter type. The invention particularly relates to a propulsion assembly for an aircraft, comprising such a turbojet engine and/or turboprop.

PRIOR ART

It is envisaged, for the new generations of commercial aircrafts, to use turbojet engines with a high ByPass Ratio (BPR), for example bypass ratios greater than 10, and with large diameter, that is to say having diameters greater than 1.5 m, in order to increase the propulsive efficiency of the turbojet engines and to reduce their fuel consumption, as well as the emissions of gaseous pollutants. It should be noted that the term "turbomachine", encompassing the "turbojet engines" and the "turboprops", designates a gas turbine apparatus providing, by reaction to the high-speed ejection of hot gas, a thrust which contributes to propulsion.

Different types of turbomachines, in particular ducted and unducted turbojet engines, can be used:
  Ultra High Bypass Ration (UHBR): ducted turbojet engine with a fixed-pitch fan wheel, with or without fan speed reduction gearbox, as illustrated in FIG. 1A,
  Variable Pitch Fan (VPF): ducted turbojet engine with a variable-pitch fan,
  Counter Rotating Open Rotor (CROR): unducted turbojet engine with (at least) two counter-rotating variable-pitch propellers, as illustrated in FIG. 1B,
  Unducted Stator Fan (USF): unducted turbojet engine with a variable-pitch propeller wheel and a fixed- or variable-pitch straightener wheel (stator).

Unducted turboprops can also be used. It should be noted that the term "turboprop" refers to a gas turbine apparatus whose thrust is mainly obtained by the traction of the variable-pitch propeller.

However, a major drawback of these integrated architectures on commercial aircrafts is their acoustic impact, that is to say the noise levels. The sound levels emitted by aircrafts are subject to increasingly strict international regulations during the take-off and landing phases, in order to limit the acoustic footprint in the vicinity of airports.

One of the main sources of noise on the turbojet engines and on the large-diameter turboprops is related to their integration or their installation on the aircraft, in particular on or under the wing. FIGS. 1A and 1B illustrate two examples of (ducted and unducted) turbojet engines with a large diameter D>1.5 m, integrated on an aircraft airfoil 10. The turbojet engine 1 is fixed on the airfoil 10 of the aircraft, by means of a strut 40, the airfoil 10 itself being fixed to the fuselage 20 of the aircraft. The ducted turbojet engine 1 (FIG. 1A) comprises a fan 30 surrounded by a nacelle 32. The unducted turbojet engine 1 (FIG. 1B) comprises two counter-rotating propellers 31.

The integration of these large-diameter turbojet engines and/or turboprops increases the interaction of the air flow accelerated by the rotating part, that is to say by the fan 30 or the propellers 31 of the turbojet engine (which produces a high-speed air jet), with the airfoil 10 (in particular the leading edge 11, and particularly the leading edge line 11a), the engine strut (or pylon) 40, high-lift devices 12, and other elements of the aircraft that generate additional noise sources. Indeed, the dimensions of these turbojet engines are such that the rotating part is disposed upstream of the leading edge 11 of the airfoil 10, and opposite thereto, such that the turbulent flows generated in the wake of the fan 30 (or of the propellers 31) directly impact the leading edge 11. The turbulent flows generated in the wake of the fan 30 or of the propellers 31 are represented by the spirals S in FIGS. 1A and 1B, and the noise generated is represented by the circular arcs in broken lines. It should be noted that the jet-airfoil interaction produces broadband noise.

In addition, this turbojet engine and/or turboprop architecture has a short and thin nacelle 32, in the case of a ducted turbojet engine (UHBR or VPF type), and the nacelle may even be absent in the case of an unducted turbojet engine (for example CROR type). This implies a significant reduction in the surfaces that can accommodate acoustic treatments, such as honeycomb-type resonators or absorbent materials, and therefore noise reduction means.

There is therefore a need for a device making it possible to overcome at least partly the aforementioned drawbacks.

DISCLOSURE OF THE INVENTION

This present disclosure relates to a propulsion assembly for an aircraft comprising a turbomachine having at least one rotating part configured to rotate about an axis of rotation of the turbomachine, an attachment strut, and a structural element carrying the turbomachine via the attachment strut, the at least one rotating part being disposed upstream of the structural element and of the attachment strut such that an air jet emerging from the rotating part, in the wake thereof, impacts said structural element and said attachment strut, a leading edge of said structural element and/or of said attachment strut locally comprising at least one acoustic attenuation device disposed at least partly in the wake of the rotating part, the acoustic attenuation device being a local modification of the structure and/or of the profile of the leading edge.

In some embodiments, the turbomachine is a turbojet engine or a turboprop. In the present disclosure, the terms "upstream", "downstream" and their derivatives are defined according to a normal flow direction of the air through the turbomachine, along the axial direction of the turbomachine, that is to say along the axis of rotation thereof. For example, when the rotating part is a fan of the turbomachine, and the structural element is an aircraft airfoil, the fan is disposed upstream of the airfoil, in particular of the leading edge of the airfoil, so that the air is first sucked in by the fan, then expelled downstream of the fan, in the direction of the airfoil.

In addition, by "disposed in the wake" it is understood that part of the leading edge of the airfoil is disposed in the path of the air expelled by the fan and flowing downstream of it, and therefore impacting said part of the leading edge.

Moreover, by "locally", it is understood that the acoustic attenuation device does not extend over the entire length of the leading edge of the structural element, but only over a portion of this leading edge. In other words, the structure and/or the profile of the leading edge is only modified locally, in particular in the wake of the rotating part, downstream of it. Preferably, at least 30% of the length of the leading edge of the structural element does not comprise the acoustic attenuation device.

Preferably, a large part of the acoustic attenuation device is disposed in the wake of the rotating part, for example at least 70% of the length of said device along the leading edge.

The fact of disposing this acoustic attenuation device, at least partly, in the wake of the rotating part, makes it possible to attenuate the noise generated by the air impacting the leading edge of the structural element and/or of the attachment strut. Particularly, the propulsion assembly according to the present disclosure makes it possible to reduce the acoustic impact of a ducted or unducted turbomachine, when the latter is installed under or on the wing of an aircraft. Furthermore, the fact of modifying the leading edge of the structural element, for example an aircraft airfoil, only locally, makes it possible to limit the influence of this device on the aerodynamics of the airfoil and on the performance of the aircraft, especially when these modifications are on a movable part of the airfoil. In addition, this local modification makes it possible to adapt the noise reduction devices to the local properties of the flow (or jet) which impacts the leading edge of the airfoil. Furthermore, the fact of modifying the structure and/or the profile of the leading edge makes this device a passive noise reduction device, not requiring air bleeds or dedicated active sensors having an energy cost.

In some embodiments, the local modification of the structure and/or of the profile of the leading edge is not uniform along a leading edge line.

It is thus possible to adapt the shape and/or the structure of the leading edge locally, according to the local properties of the flow, or air jet that impacts the leading edge.

In some embodiments, the acoustic attenuation device comprises corrugations along the leading edge, the corrugations having a succession of valleys and peaks.

Preferably, a corrugation comprises at least two valleys and at least two peaks. It is understood that the "valleys" and the "peaks" are considered along the direction of the structural element chord which is substantially parallel to the axis of rotation of the turbomachine. Consequently, the valleys are regions where the chord of the structural element is weaker than at the peaks. These corrugations, or serrations, constitute a local modification of the profile of the leading edge, and therefore a passive noise attenuation solution.

In some embodiments, an amplitude $h(z)$ of the corrugations and/or a spacing $\lambda(z)$ between two successive peaks of the corrugations varies along the leading edge as a function of a distance E, the distance E being a distance between a position z along the leading edge and the rotating part, along a direction parallel to the axis of rotation.

It is understood that an amplitude $h(z)$ of the corrugations corresponds, at a given position z along the leading edge, to the distance between the bottom of the valley of the corrugation and its peak closest to this position z, this distance being considered along a direction parallel to the axis of rotation. Similarly, the spacing $\lambda(z)$ corresponds to the distance, at a given position z along the leading edge, between two peaks (or two valleys) of a corrugation closest to this position z.

Since the distance between the rotating part and the leading edge is not constant along the leading edge line, the impact of the air on the leading edge and therefore the local properties of the flow therefore also vary as a function of this distance. The fact of modifying the amplitude of the corrugations and/or the spacing between two successive peaks of the corrugations thus makes it possible to adapt the device according to this distance, and therefore according to the properties of the flow.

In some embodiments, the amplitude $h(z)$ of the corrugations is such that $0.005c(z)<h(z)<0.5c(z)$, $c(z)$ being the value of a chord of the structural element or of said attachment strut as a function of a position z along the leading edge. This relation makes it possible to limit the mechanical impact of the corrugations, or serrations.

In some embodiments, the acoustic attenuation device is such that the leading edge locally comprises a porous material.

The porous material can be a metal foam. The porous materials such as the metal foams have the advantage of having good acoustic properties, and of being effective in reducing the broadband noise, particularly at low frequencies. This configuration corresponds to a local modification of the structure of the leading edge, also making this device a passive acoustic attenuation device. Preferably, the dimensions and positions of the region(s) of the leading edge having this material are similar to those defined in the case of the corrugations, in particular the dimensions L, corresponding to the length, along the leading edge line, over which the porous material extends, and h, corresponding to the length of this porous material, in the direction of the chord of the support element.

In some embodiments, the porous material has a porosity rate $t(z)$ variable along the leading edge.

The porosity rate is the ratio of the volume occupied by air to the total volume of the porous material. In the same way as for the corrugations, these variations in the porosity rate make it possible to adapt the absorbent properties of the material according to the properties of the flow of the jet/wake generated by the vanes/blades of the rotating part disposed upstream of the structural element. The porosity rate is preferably lower for the porous materials closest to a fuselage of the aircraft, than for the porous materials furthest from the fuselage, when the acoustic attenuation device is applied to an aircraft airfoil.

In some embodiments, the spaces between two peaks of the corrugations are at least partially filled with a porous material.

This configuration makes it possible to combine a modification of the profile, and a modification of the structure of the leading edge, thus further improving the effectiveness of the acoustic attenuation device.

In some embodiments, the structural element is an aircraft airfoil, the acoustic attenuation device extending over a distance L of the airfoil, such that $L<2.5D$, where D is a diameter of the rotating part of the turbomachine.

In some embodiments, the spacings $\lambda(z)$ between two successive peaks and/or the amplitudes $h(z)$ of the corrugations are lower for the corrugations closest to a fuselage of the aircraft, than for the corrugations furthest from the fuselage.

When the structural element is a airfoil fixed to a fuselage, the distances between the leading edge of the airfoil and the rotating part are generally smaller in the vicinity of the fuselage, that is to say in the vicinity of the root, or embedment of the airfoil. Consequently, the fact of reducing the spacings between two successive peaks, in other words the wavelength of the corrugations, and/or the amplitudes of the corrugations, allows the acoustic attenuation device to adapt to this configuration.

In some embodiments, the at least one acoustic attenuation device comprises a single valley, the valley extending over a distance L along the leading edge of the airfoil, such that L≥2.5D.

According to this configuration, the modification of the leading edge does not appear in the form of a corrugation (comprising at least a valley and a peak), but comprises a single valley, extending over a greater distance, along the line of the leading edge, than a valley of a corrugation. This configuration makes it possible to locally modify the aerodynamic profile of the airfoil. It will be noted that the leading edge can comprise two acoustic attenuation devices, therefore two of these valleys, disposed at different regions along the line of the leading edge, preferably at the place where the propeller blade tip vortices impact the airfoil. Alternatively, it is also possible to locally modify the sweep of the airfoil, thus locally increasing the distance between the leading edge and the rotating part.

The increase of this distance makes it possible to reduce the turbulence of the flow, before it interacts with the leading edge of the airfoil, making it possible to effectively reduce the noise. In addition, the increase of the sweep decreases the correlation of the noise sources along the leading edge. In the same way as for the corrugations, the maximum amplitude of the valley h(z), in other words the maximum depth of the valley, can satisfy the relation $0.005c(z) < h(z) < 0.5c(z)$.

In some embodiments, the leading edge locally comprises at least a first and at least a second acoustic attenuation device extending respectively over a distance L1 and L2 along the leading edge, such that L1+L2<2.5D.

Each of the first and of the second acoustic attenuation device may comprise corrugations or a single valley. Furthermore, the number of acoustic attenuation devices along the leading edge is not limited to two, but may be greater. For example, a number n of acoustic attenuation devices can be disposed locally along the leading edge, such that L1+L2+ ... +Ln<2.5D.

In some embodiments, a cover is configured to move from a closed position in which the acoustic attenuation device is covered by the cover, to an open position in which the acoustic attenuation device is uncovered.

The cover can be a movable cowl, a morphing system at the leading edge, or a leading edge slat. This cover allows the corrugations to be visible or active only during certain phases of the flight, such as takeoff and landing. This makes it possible to hide the corrugations, and therefore have a smooth leading edge during cruising, that is to say outside the take-off and landing phases. The advantage in hiding the corrugations during cruising is to eliminate their impact on the overall aerodynamic performance when noise reduction is not needed.

In some embodiments, a diameter D of the rotating part of the turbomachine is such that D>1.5 m.

In some embodiments, the turbomachine comprises a fixed part disposed downstream of the rotating part, the attachment strut being fixed to the fixed part. The fixed part can be a straightener of the flow emerging from the rotating part.

The present disclosure also relates to an aircraft comprising the propulsion assembly according to any one of the preceding embodiments.

BRIEF DESCRIPTION OF THE DRAWINGS

The invention and its advantages will be better understood upon reading the detailed description given below of different embodiments of the invention given by way of non-limiting examples. This description refers to the pages of appended figures, on which:

FIGS. 1A and 1B represent front and top views of the propulsion assembly according to the prior art, FIG. 2 represents a top view of a propulsion assembly according to a first embodiment of the invention, FIG. 3 represents a top view of a propulsion assembly according to a modified example of the first embodiment of the invention, FIG. 4 represents a top view of a propulsion assembly according to another modified example of the first embodiment of the invention, FIG. 5 represents a top view of a propulsion assembly according to a second embodiment of the invention, FIG. 6 represents a top view of a propulsion assembly according to a modified example combining the first and the second embodiment of the invention, FIG. 7 represents a top view of a propulsion assembly according to a third embodiment of the invention, FIG. 8 represents a top view of a propulsion assembly according to a modified example of the third embodiment of the invention, FIG. 9 represents a top view of a propulsion assembly according to a fourth embodiment of the invention, FIGS. 10A to 10C represent different examples of aircrafts, seen from the front, comprising a propulsion assembly according to any one of the embodiments of the invention.

DESCRIPTION OF THE EMBODIMENTS

A first embodiment of the present disclosure will be described with reference to FIGS. 2 to 4. It is noted that the rest of the description refers to a propulsion assembly comprising a turbojet engine. This example is however not limiting, the invention can also be applied to a propulsion assembly comprising a turboprop.

The propulsion assembly illustrated in FIG. 2 comprises an unducted turbojet engine 1 having a rotating part, and being fixed to a structural element by means of an attachment pylon or strut 40 (not visible on FIG. 2). In this example, the structural element is an aircraft airfoil 10, and the turbojet engine 1 is fixed below the airfoil 10. The rotating part of the turbojet engine 1 comprises the counter-rotating propellers 31, movable about an axis of rotation A. A spatial reference frame comprises an axis X corresponding to the main axis of the fuselage 20, substantially parallel to the axis of rotation A, and an axis Z perpendicular to the axis X, corresponding to the longitudinal direction along which the airfoil 10 extends, from its root 10a fixed to the fuselage 20, to its opposite end 10b. The plane X-Z, corresponding to a horizontal plane, which comprises the leading edge line 11a of the airfoil 10, in the absence of a dihedral angle on the airfoil. In the presence of a dihedral angle, the plane X-Z would not be horizontal, but would comprise the leading edge line 11a. A front view is a view parallel to the axis X, and a top view is a view perpendicular to the plane X-Z. In addition, an upstream-downstream direction corresponds to a flow direction of the air entering at a speed U in the rotating part, then emerging from the rotating part, towards the leading edge 11 of the airfoil 10, along the axis of rotation A, in other words along the axis X. The propellers 31 are disposed upstream the leading edge 11, and opposite the latter along the axis X.

The propulsion assembly according to this embodiment differs from the assemblies illustrated in FIGS. 1A and 1B, in that it comprises an acoustic attenuation device, the acoustic attenuation device comprising corrugations 50, or serrations, locally along the leading edge line 11*a*. These corrugations extend over a length L along the leading edge line 11*a*, so that L<2.5D, D being the diameter of the turbojet engine 1, that is to say the diameter of the propellers 31 in the case of an unducted turbojet engine, or the diameter of the air inlet of the nacelle 32 in the case of a ducted turbojet engine, equivalent to the diameter of the rotating part. It should be noted that the figures do not illustrate machines with real scales and proportions, the dimensions of the turbojet engine, in particular its diameter D, being deliberately exaggerated, in order to facilitate its visibility and description. For example, the span of an airfoil/wing of a 200-passenger commercial aircraft is of the order of 15 to 20 m, with an engine of 2 m in diameter.

Apart from the corrugations 50, the leading edge line 11*a* has an unmodified profile, corresponding to a usual profile, or neutral profile, not comprising any acoustic attenuation device. The neutral profile is represented by the dashed line in FIG. 2. The length L is such that a large part of the corrugations 50, preferably at least 70% of the length L, are in the wake of the rotating part of the turbojet engine, that is to say in this example propellers 31. In other words, a fictitious cylinder of diameter D and axis A, extending downstream of the propellers 31, comprises part of the leading edge 11, and in particular comprises at least 70% of the length L of the acoustic attenuation device.

The corrugations 50 are characterized by a succession of valleys 51 and peaks 52. A valley 51 corresponds to a local recess of the leading edge 11 downstream, relative to an unmodified profile of the leading edge (cf. dashed lines in FIG. 2) in the direction of the chord c of the airfoil, corresponding to the direction of the axis X. A peak 52 corresponds to a relief, or overhang of the leading edge upstream, with respect to an unmodified profile of the leading edge (cf. dashed lines in FIG. 2) in the direction of the chord c of the airfoil, corresponding to the direction of the axis X.

A height h is a distance, in a direction perpendicular to the neutral leading edge line 11*a*, or in a direction parallel to the engine axis A, between successive valley 51 and peak 52, more precisely between the bottom of the valley 51 and the end of the peak 52. In other words, the height h corresponds to the amplitude of the corrugations 50. A length A is a distance, in a direction parallel to the neutral leading edge edge 11*a*, between two successive valleys 51 (or between two successive peaks 52). In other words, the length A corresponds to the wavelength of the corrugations 50.

In the example illustrated in FIG. 2, the propulsion assembly comprises a single acoustic attenuation device, extending over a length L along the leading edge line 11*a*. FIG. 3 illustrates an alternative example of the first embodiment, in which the propulsion assembly comprises two acoustic attenuation devices, extending respectively over a distance L1 and L2 along the leading edge line 11*a*, such that L1+L2<2.5D. According to this alternative, the turbojet engine 1 is a ducted turbojet engine comprising a rotating part, in this case, a fan 30 and a nacelle 32. The turbojet engine 1 is fixed above the airfoil 10 by means of an attachment strut 40. The respective corrugations 50*a*, 50*b* of the two acoustic attenuation devices are disposed on either side of the strut 40, in the wake of the fan 30, such that the air jet (not represented again in FIG. 3 and the following figures, for the sake of clarity) emerging from the fan 30, impacts the corrugations 50*a*, 50*b*. In this example, the corrugations 50*a*, 50*b* each comprise two valleys 51 and two peaks 52. However, more valleys 51 and peaks 52 are also possible for each acoustic attenuation device 50*a*, 50*b*.

In the examples of the first embodiment, illustrated in FIGS. 2 and 3, the corrugations are uniform over the entire length L, and are also identical over the lengths L1 and L2. By "uniform" or "identical", it is understood that the amplitudes h and the wavelengths λ are constant along the leading edge line 11*a*.

FIG. 4 illustrates a modified example of the first embodiment, in which the propulsion assembly also comprises two acoustic attenuation devices. The turbojet engine 1 is also an unducted turbojet engine, fixed above the airfoil 10. Unlike the example illustrated in FIG. 3, the corrugations 50*a* and 50*b* are not identical, but have amplitudes h and/or different wavelengths A between these two devices. More specifically, the amplitude h(z) and the wavelength λ(z) vary as a function of the position z along the leading edge line 11*a*, in the direction Z.

It will be noted that the distances E1 and E2 each correspond to a distance between a point along the leading edge line 11*a*, for example a peak 52 of a corrugation, and the rotating part, in the direction X. More specifically, the distance E2 corresponds to the distance between the rotating part and the leading edge 11, at the level of the trailing edge of a first radial end of the rotating part, corresponding to the end closest to the fuselage 20, and the distance E1 corresponds to the distance between the rotating part and the leading edge 11, at the level of a second radial end of the rotating part, diametrically opposite to the first radial end, and corresponding to the end furthest from the fuselage 20.

Given the profile of the airfoil 10, whose section decreases from the root 10*a* to the end 10*b*, and the sweep angle of the airfoil 10, the distance E2 is smaller in the vicinity of the fuselage 20, than the distance E1, furthest from the fuselage 20. Consequently, the size of the vortices, characterized by an integral scale A (represented in FIG. 2), generated by the turbulent flow downstream of the rotating part, and impacting the leading edge 11, differs depending on the position z along the leading edge line 11*a*. Indeed, in the vicinity of the trailing edge of the rotating part, the width of the wake is small, and characterized by small vortices. The turbulent flow then develops downstream, gradually increasing the size of the vortices, that is to say of the integral scale A. When the distance between the rotating part 30, 31 and the leading edge 11 is smaller, the size of the vortices impacting the leading edge 11 is also smaller, insofar as these vortices have been able to develop in a lesser extend than when this distance is greater.

In this context, it is therefore preferable that the wavelengths λ(z) and/or the amplitudes h(z) are lower for the corrugations closer to the fuselage 20 of the aircraft. In the example illustrated in FIG. 4, the wavelengths $\lambda_1(z)$ of the corrugations 50*a* and the wavelengths $\lambda_2(z)$ of the corrugations 50*b* are such that $\lambda_1(z) > \lambda_2(z)$. Indeed, the smaller the distance between the rotating part 30, 31 of the turbojet engine and the leading edge 11 of the airfoil 10, the more the integral scale ∧ (represented in FIG. 2) of the turbulent flow downstream of the rotating part, decreases. However, the optimal amplitudes and wavelengths of the corrugations depend on this integral scale ∧ of the turbulence. Preferably, the wavelength values λ, as a function of the position z along the leading edge line 11*a*, approximately satisfy λ(z)=∧(z)/2, in order to maximize the acoustic gains.

The example in FIG. 4 illustrates a scenario in which the propulsion assembly comprises two acoustic attenuation devices 50*a*, 50*b*, the corrugations of each of them being different. This example is however not limiting, a configuration according to which the propulsion assembly comprises a single device, as in the example of FIG. 2, but with non-uniform corrugations over the length L, also being possible. The wavelengths A can be for example an increasing wavelength, from the end of the corrugations 50 closest to the fuselage 20, to the end of the corrugations 50 furthest from the fuselage 20. In addition, the amplitude h of the corrugations 50 preferably satisfies $0.005c(z)<h(z)<0.5c(z)$, where $c(z)$ corresponds to the value of the chord c of the airfoil 10, at a position z along the leading edge line 11a.

A second embodiment of the present disclosure will be described with reference to FIG. 5.

The propulsion assembly illustrated in FIG. 5 comprises a ducted turbojet engine 1 comprising a nacelle 32 surrounding a fan 30 and being fixed above an airfoil 10 by means of an attachment pylon or strut 40. The propulsion assembly according to the second embodiment differs from the first embodiment in that the acoustic attenuation device is such that the leading edge 11 of the airfoil 10 locally comprises a porous material 60, preferably a metal foam. Contrary to the presence of corrugations, the profile of the leading edge line 11a is not modified, but the structure of the leading edge 11, particularly the material, is locally modified.

In the same way as for the first embodiment, a single acoustic attenuation device can be disposed along the leading edge over a distance L, in which the porous material may not be uniform, for example by presenting a porosity rate variable along the leading edge line. The porosity rate is defined as the volume ratio occupied by air to the total volume of the porous material. Alternatively, and according to the example illustrated in FIG. 5, two acoustic attenuation devices are disposed on either side of the strut 40, in the wake of the fan 30. These devices are such that the respective porous materials 60a, 60b of the acoustic attenuation devices each have a porosity rate $t_1(z)$ and $t_2(z)$, respectively, different from each other, and function of the position z along the leading edge line 11a. Particularly, the porosity rate $t_2(z)$ of the porous material 60b closer to the fuselage 20 is lower than the porosity rate $t_1(z)$ of the porous material 60a, further from the fuselage 20, for the same reasons as in the case of corrugations. Particularly, the variation of these porosity rates makes it possible to adapt the noise attenuation as a function of the distance between the leading edge 11 and the rotating part. Furthermore, the thickness $h(z)$ of the porous material, that is to say the distance over which the porous material extends along the axis X, preferably satisfies the same relation as the amplitude of the corrugations, as a function of the chord, that is to say $0.005c(z)<h(z)<0.5c(z)$.

FIG. 6 illustrates a configuration combining the first and second embodiments of the present disclosure. According to this configuration, the propulsion assembly comprises corrugations 50a, 50b similar to the corrugations represented in FIG. 4, in which the spaces between the teeth formed by the corrugations are partially or completely filled with porous material, preferably the porous materials 60a, 60b as described in the embodiment illustrated in FIG. 5 and having the same characteristics. This configuration makes it possible not to modify, or to minimize the modifications of the profile of the leading edge 11 of the airfoil 10.

A third embodiment of the present disclosure will be described with reference to FIGS. 7 and 8.

According to this embodiment, the profile of the leading edge 11 of the airfoil 10 is modified locally, in order to locally increase the distances E1, E2 between the rotors (or stators) of the rotating part of the turbojet engine 1 and the leading edge 11 of the airfoil 10. Unlike the corrugations according to the first embodiment, comprising at least one valley and at least one peak, the attenuation device according to this third embodiment locally comprises a single valley 70. In the example illustrated in FIG. 7, the propulsion assembly comprises two acoustic attenuation devices each comprising a single valley 70a, 70b respectively, on either side of the attachment strut 40. The valleys 70a, 70b can extend respectively over a distance L1 and/or L2 of up to twice the diameter D of the turbojet engine. Moreover, as for the corrugations, the maximum amplitude $h(z)$ of the valley can satisfy the relation $0.005c(z)<h(z)<0.5c(z)$.

The local increase of this distance makes it possible to reduce the turbulence of the flow before it interacts with the leading edge 11 of the airfoil 10, and thus to improve the effectiveness of the reduction of the noise.

Alternatively, the local increase of the distance between the leading edge 11 and the rotating part can be induced by a local increase 80 of the sweep $\alpha$ of the airfoil 10, as illustrated in FIG. 8. According to this example, two local increases 80a, 80b of the sweep of the airfoil 10 are made on either side of the strut 40, in the wake of the fan 30. These increases 80a, 80b of the sweep are of a value $\alpha''$ and $\alpha'$ respectively, such that the augmented sweep is equal to $\alpha''+\alpha$ and $\alpha'+\alpha$ respectively. The dashed line represents the leading edge line in the absence of an acoustic attenuation device, with an unmodified arrow. The value values $\alpha'$ and $\alpha''$ are preferably different, in order to adapt the modification of the sweep to the distance between the fan 30 and the leading edge 11. The local increase of the sweep makes it possible to reduce the correlation of the noise sources along the leading edge.

The acoustic attenuation devices according to the different embodiments of the invention can be used with de-icing systems, which can be reinforced at the level of the valleys and the porous materials.

FIG. 9 illustrates a modified example of the present disclosure, in which the acoustic attenuation device is disposed on an attachment strut 40, making it possible to fix a turbojet engine 1 to the fuselage 20, and not to an airfoil 10. According to this configuration, the structural element is the portion of the fuselage 20 to which the attachment strut 40 is fixed. This configuration is adapted for turbojet engines installed at the rear tip of the fuselage 20, in a configuration called "puller" configuration, in which the propellers 31 (or the fan 30 in the case of a ducted turbojet engine) are disposed upstream of the attachment pylon 40, in the direction of flow of the air flowing along the axis of rotation A at a speed U. In the example illustrated in FIG. 9, the acoustic attenuation device comprises corrugations 50, and a porous material 60.

FIGS. 10A to 10C illustrate different types of aircrafts 100, on which the propulsion system according to the present disclosure is applicable. The invention can in particular be used for airfoils 10 having unconventional profiles and shapes, such as low airfoils whose dihedral Δ is scalable in span, in particular stronger (dihedron Δ') on an inner side of the airfoil 10 (FIG. 10A). This type of airfoil ensures the ground clearance, that is to say the distance between the engine and the ground, defined in the standards for large-diameter engines. FIG. 10B shows an aircraft having a high airfoil 10, and FIG. 10C shows an aircraft whose airfoil 10 has an inverted sweep $\alpha$.

Although the present invention has been described with reference to specific exemplary embodiments, it is obvious that modifications and changes can be made to these examples without departing from the general scope of the invention as defined by the claims. Particularly, individual features of the different illustrated/mentioned embodiments can be combined in additional embodiments. Particularly, the characteristics related to the parameters described in one embodiment, for example the heights and the lengths L, L1 and L2, can also be applicable to other embodiments described in the present disclosure. Accordingly, the description and drawings should be considered in an illustrative rather than restrictive sense.

The invention claimed is:

1. A propulsion assembly for an aircraft comprising a turbomachine having at least one rotating part configured to rotate about an axis of rotation of the turbomachine, an attachment strut, and an aircraft wing carrying the turbomachine via the attachment strut which is intercalated between the aircraft wing and the turbomachine, the at least one rotating part being disposed upstream of the aircraft wing and of the attachment strut such that an air jet emerging from the rotating part, in the wake thereof, impacts said aircraft wing and said attachment strut, a leading edge of said aircraft wing locally comprising at least one acoustic attenuation device disposed at least partly in the wake of the rotating part, the acoustic attenuation device being a local modification of a structure and/or of a profile of the leading edge, and extending over a distance L of the aircraft wing, such that L<2.5D, where D is a diameter of the rotating part of the turbomachine.

2. The assembly according to claim 1, wherein the acoustic attenuation device comprises corrugations along the leading edge, the corrugations having a succession of valleys and peaks.

3. The assembly according to claim 2, wherein an amplitude $h(z)$ of the corrugations and/or a spacing $\lambda(z)$ between two successive peaks of the corrugations varies along the leading edge as a function of a distance E, the distance E being a distance between a position z along the leading edge and the rotating part, along a direction parallel to the axis of rotation.

4. The assembly according to claim 3, wherein the amplitude $h(z)$ of the corrugations is such that $0.005c(z)<h(z)<0.5c(z)$, $c(z)$ being a value of a chord of the wing as a function of a position z along the leading edge.

5. The assembly according to claim 1, wherein the acoustic attenuation device is such that the leading edge locally comprises a porous material.

6. The assembly according to claim 5, wherein the porous material has a porosity rate $t(z)$ variable along the leading edge.

7. The assembly according to claim 2, wherein spaces between two peaks of the corrugations are at least partially filled with a porous material.

8. The assembly according to claim 1, wherein the at least one acoustic attenuation device comprises a single valley, the valley extending over a distance L along the leading edge of the aircraft wing, such that L<2.5D.

9. The assembly according to claim 1, wherein the leading edge locally comprises at least a first and at least a second acoustic attenuation device extending respectively over a distance L1 and L2 along the leading edge, such that L1+L2<2.5D.

10. The assembly according to claim 1, wherein the turbomachine comprises a fixed part disposed downstream of the rotating part, the attachment strut being fixed to the fixed part.

11. An aircraft comprising the propulsion assembly according to claim 1.

12. The assembly according to claim 1, wherein at least 70% over distance L of the aircraft wing is within the diameter D the rotating part of the turbomachine.

13. The assembly according to claim 1, wherein the at least one acoustic attenuation device includes a first acoustic attenuation device and a second acoustic attenuation device disposed on the leading edge, wherein the first acoustic attenuation device includes first corrugations and the second acoustic attenuation device includes second corrugations.

14. The assembly according to claim 13, wherein an amplitude of the first corrugations are different than an amplitude of the second corrugations.

15. The assembly according to claim 13, wherein a wavelength of the first corrugations are different than a wavelength of the second corrugations.

16. A propulsion assembly for an aircraft comprising a turbomachine having at least one rotating part configured to rotate about an axis of rotation of the turbomachine, an attachment strut, and an aircraft airfoil carrying the turbomachine via the attachment strut, the at least one rotating part being disposed upstream of the airfoil and of the attachment strut such that an air jet emerging from the rotating part, in the wake thereof, impacts said airfoil and said attachment strut, a leading edge of said airfoil locally comprising at least one acoustic attenuation device disposed at least partly in the wake of the rotating part, the acoustic attenuation device being a local modification of a structure and/or of a profile of the leading edge, and extending over a distance L of the airfoil, such that L<2.5D, where D is a diameter of the rotating part of the turbomachine, wherein the acoustic attenuation device comprises corrugations along the leading edge, the corrugations having a succession of valleys and peaks, wherein an amplitude $h(z)$ of the corrugations and/or a spacing $\lambda(z)$ between two successive peaks of the corrugations varies along the leading edge as a function of a distance E, the distance E being a distance between a position z along the leading edge and the rotating part, along a direction parallel to the axis of rotation, wherein the amplitude $h(z)$ of the corrugations is such that $0.005c(z)<h(z)<0.5c(z)$, $c(z)$ being a value of a chord of the airfoil as a function of a position z along the leading edge.

* * * * *